July 8, 1930.                H. E. LAKE                1,770,339
                          AUTOMATIC DAMPER
                   Filed March 10, 1928    2 Sheets-Sheet 1

Harry E. Lake  Inventor
By his Attorney
Louis Prevost Whitaker

July 8, 1930. H. E. LAKE 1,770,339
AUTOMATIC DAMPER
Filed March 10, 1928 2 Sheets-Sheet 2
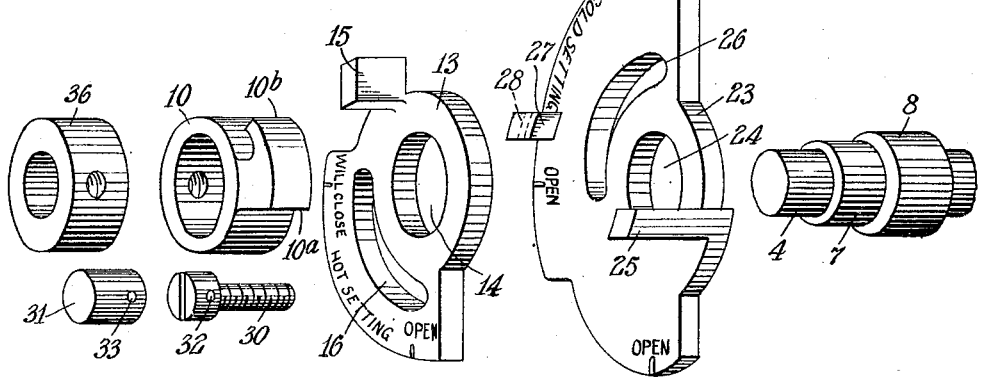
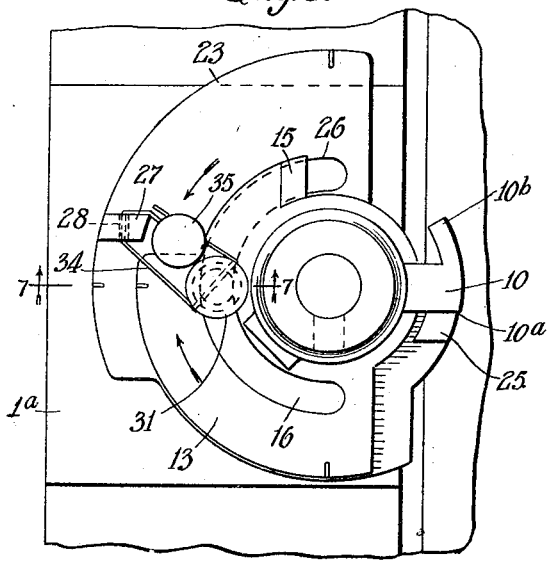
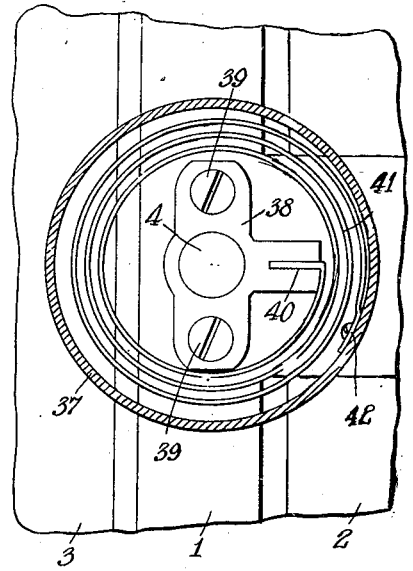
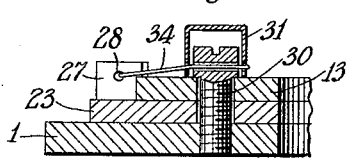
Harry E. Lake, Inventor
By his Attorney Patented July 8, 1930

1,770,339

UNITED STATES PATENT OFFICE

HARRY E. LAKE, OF NEW YORK, N. Y., ASSIGNOR TO PREFERRED UTILITIES MANUFACTURING CORPORATION, OF NEW YORK, N. Y., A CORPORATION OF DELAWARE

AUTOMATIC DAMPER

Application filed March 10, 1928. Serial No. 260,745.

My invention consists in the novel features hereinafter described, reference being had to the accompanying drawings which show one embodiment of my invention selected by me for purposes of illustration, and the said invention is fully disclosed in the following description and claims.

The object of my invention is to provide an automatic damper unit for use in a stack or smoke pipe through which heated gaseous products are conveyed, and adapted especially for use in connection with heating furnaces and especially with those in which the heat is supplied by means of an oil or gas burner, although it may be employed in any connection in which its use is desirable. The damper is operated by a thermostatic member, preferably in the form of a coil or helix, one end of which is connected with the damper and the other end is connected with a relief spring, so that when the damper is closed and the thermostatic member continues to operate under higher temperature than the closing temperature, the strain on the thermostatic member is taken by the relief spring, and distortion and injury to the thermostatic member is prevented. The device is also provided with means for readily adjusting the position of the damper in its closed and open positions, and means are provided for sealing these adjusting means, so that their positions cannot be changed without breaking the seal, thus preventing the damper adjustments from being changed by unskilled persons who may be in charge of the heating plant and who might adjust the damper to an uneconomic position, or even to one involving danger to the plant, or the occupants of the building in which it is located. The damper unit also includes a casing provided with means for suspending it when used in connection with a horizontal stack, to relieve the stack from the weight of the damper unit.

Referring to the accompanying drawings,

Fig. 4 is a detail perspective view showing the parts of the adjusting means detached from each other.

Fig. 5 is an enlarged elevation of the adjusting means.

Fig. 6 is an enlarged sectional view of the spring relief mechanism for the thermostatic element.

Fig. 7 is a detail section on line 7—7 of Fig. 5, showing the means for sealing the adjusting means.

Figure 1:
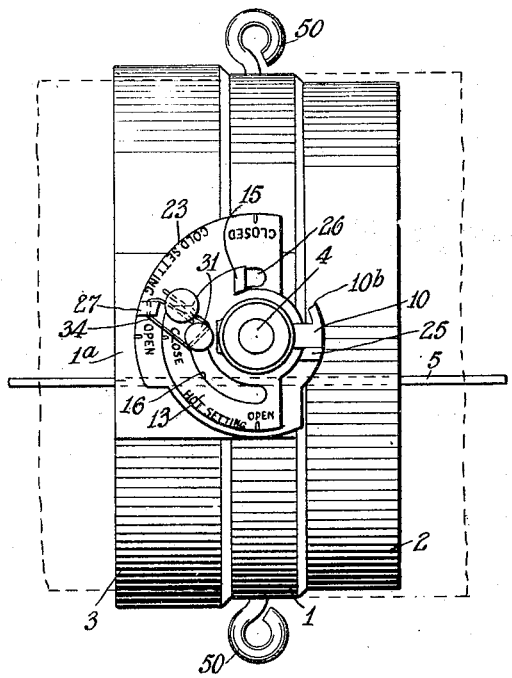
Fig. 1 is a top plan view of my improved automatic damper unit showing the damper adjusting and sealing means.
Figure 2:
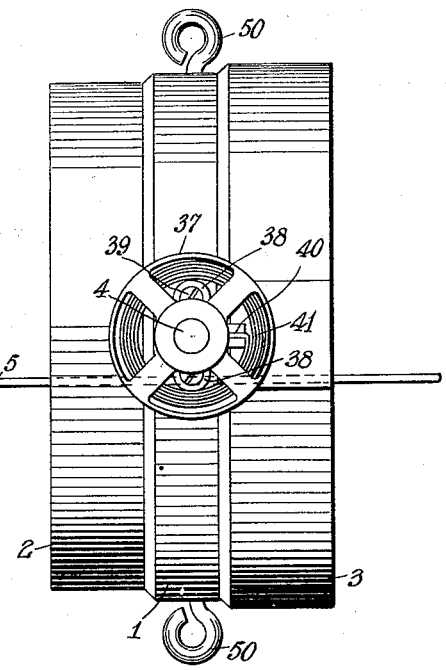
Fig. 2 is a view taken from the opposite side and showing the relief spring for the thermostatic element.

In the embodiment of my invention illustrated in the accompanying drawings, 1, represents the damper casing or body, which is of cylindrical form, and provided at its opposite ends with sleeve portions, 2 and 3, respectively, to receive the adjacent sections of the stack. In this instance the sleeve, 2, is of smaller diameter than the sleeve, 3, and is intended to be fitted into one of the pipe sections, as indicated in dotted lines in Fig. 1, for example, the sleeve, 3, having its internal diameter of such size as to permit the adjacent section of the stack to be inserted therein, as also indicated in dotted lines in Fig. 1. The casing, 1, is provided with a shaft extending transversely through the same and indicated at 4, to support the rotary damper, 5, which is preferably formed of thin cast metal, which may be reinforced by suitable webs, $5^b$, and provided at one point with a bearing lug, 6, engaging the shaft, 4, adjacent to one end of the shaft, the damper being provided at its opposite side or edge with a sleeve, 7, engaging the shaft, 4, and extending longitudinally thereof through a bearing sleeve, 8, fitted in an aperture in the casing and projecting beyond the outer surface of the same. The opposite side of the casing is provided with a bearing sleeve, 9, which engages and supports the shaft, 4. While I prefer to form the damper, 5, of cast metal with the bearing lug, 6, and sleeve, 7, cast integrally therewith it is entirely obvious that the damper might be formed of sheet metal and that the bearing lug and sleeve may be in such case formed separately and secured to the damper in any usual or desired manner. The bearing sleeve, 8, as before stated extends beyond the outer surface of the casing, 1, and forms the bearing support for the adjustable stop plates hereinafter described, while the sleeve, 7, of the damper projects beyond the outer end of the bearing sleeve, 8, and is provided with a movable damper stop lug, 10, which in this instance is carried on a collar, 11, mounted on the outer end of the sleeve, 7, and secured thereto by a set screw, 12. Upon the projecting portion of the stationary bearing sleeve, 8, are mounted a pair of superimposed adjustable stop plates, 13 and 23, shown detached in Fig. 4. The plate, 23, is provided with a central aperture, 24, to engage the sleeve 8, and a stop lug, 25, to engage the face, 10$^a$, of the damper stop lug, 10, and determine the open position of the damper. The plate, 23, is also provided with a curved slot 26, which is co-axial with the aperture, 24, and the said plate is also provided with a sealing lug, 27, perforated as indicated at 28, for the passage of a sealing wire therethrough. The plate, 13, is also provided with an aperture 14, for engaging the stationary sleeve, 8, and stop lug indicated at 15, for engaging a projection, 10$^b$, of the damper stop lug, 10, and a curved slot, 16, co-axial with the aperture, 14.

The casing, 1, is provided adjacent to the stationary bearing sleeve, 8, with an exterior flattened portion, 1$^a$. The plates, 23 and 13, are placed in position with their apertures, 24, and 14, respectively, engaging the bearing sleeve, 8, the plate, 23, engaging said flattened portion of the casing, and the plates are secured in position with respect to the casing and adjustable with respect to the damper stop lug, 10, by means of a single screw, indicated at 30, which passes through the curved slots, 16, and 26, of the adjustable stop plates, and is threaded into an aperture in the flattened portion, 1$^a$, of the casing. The plates are so formed that their slots, 16, and 26, extend in opposite directions from the screw, 30, as clearly shown in Fig. 5 for example and when the adjacent ends of the slots are both in engagement with the screw, as shown in that figure, the damper will have its greatest range of movement, which is approximately 90°, the engagement of the damper stop lug, 10, with the stop lug, 25, determining the position of the damper when in open position, and the engagement of the damper stop lug, 10, with the stop, 15, determining the position of the damper when in closed position. By loosening the set screw, 30, and turning the plates, 13 and 23, respectively, in the directions indicated by the arrows in Fig. 5, as permitted by their respective slots, the range of movement of the damper from open to closed position as permitted by the stops, 25 and 15, respectively, can be adjusted in accordance with the requirements of the installation with which the damper is employed. When the desired range of movement from open to closed position has been determined, the set screw, 30, will be set up tight, thereby simultaneously locking both of said plates, 13 and 23, with respect to each other and to the casing, and holding the stops, 25 and 15, in fixed relation with each other and with the casing.

This construction is extremely simple and at the same time is strong, efficient and very easily adjusted to accommodate exactly the desired range of movement of the damper, and to arrest the damper in exactly the desired closed or partially closed or open or partially open positions to which it is moved automatically, as hereinafter described, by the thermostatic member or element. In some instances, and especially in the operation of furnaces fired with oil or gas under forced draft, an improper adjustment of the damper would tend to decrease the efficiency of the furnace and might result in creating a dangerous condition, and it is, therefore, desirable to provide means for preventing unskilled persons from disturbing the adjustment of the damper stops after they have been accurately determined by an expert under whose supervision such installations are ordinarily made. I, therefore, provide a very simple and effective means for preventing any change in the adjustment of the plates, 13 and 23, after they have been set, and the screw, 30, tightly screwed in. In this instance I have shown the plate, 23, provided with the sealing lug, 27, before referred to, and I also provide a cap, 31, adapted to fit over the screw, 30, the cap and the head of the screw being provided with registering transverse apertures, 32 and 33, respectively, and a sealing wire, indicated at 34, is passed through the registering apertures, in the screw, 30, and cap, 31, and through the sealing aperture, 28, in the lug, 27, and the ends of the wire are connected by the usual lead seal, indicated at 35. The cap prevents the operation of the screw by a screw driver until it is removed, and the sealing wire prevents the removal of the cap, so that the device cannot be tampered with, or the adjustment of the damper changed, without cutting the sealing wire or destroying the seal, and the device is, therefore, protected against injudicious manipulations by unskilled persons who may be temporarily in charge of the heating plant.

The shaft, 4, which carries the damper, is provided at one end with a collar, indicated at 36, secured thereto by a set screw for preventing the longitudinal movement of the shaft, and the opposite end of the shaft is provided with a spring housing, 37, within which is a block, 38, secured to the casing, 1, by screws, 39, and provided with means, as a notched portion, 40, for receiving one end of a relief spring, 41, the other end of which is secured to the spring housing, as at 42. This relief spring holds the shaft normally from movement in a rotary direction.

The thermostatic member is indicated at 43, and comprises a coil or helix of suitable material, as for example parallel strips of metals having different co-efficients of expansion, or any other desired material, one end of the coil or helix, as at 44, being connected with the shaft, and the other end, as at 45, being connected to the damper at a point distant from its axis of rotation, and the helix being so constructed and arranged that when subjected to high temperature its expansion will effect the rotation of the damper in a direction toward its closed position. The damper stop lug, 10, is secured to the shaft, 4, in such position that when its face, $10^a$, is in contact with the stop lug, 25, on the plate, 23, and the end of the slot, 26, indicated at $x$, is in engagement with the screw, indicated at 30, the thermostatic member will hold the damper in its open position when cold, and as the products of combustion passing through the damper casing and stack become more and more highly heated, the thermostatic member will move the damper toward its closed position until the projection, $10^b$, on the damper stop lug engages the stop lug, 15, on the plate, 13. As before stated, the plates, 13 and 23, are adjusted with respect to each other and the casing, so as to regulate the range of movement which will be imparted to the damper by the thermostatic member. It will also be understood that when the damper is in the so-called closed position, it does not entirely close under any circumstances the aperture within the damper casing, 1, and as is usual in all dampers, the damper, 5, is provided with a central aperture, indicated at $5^a$, to provide for a portion at least of the minimum draft permitted. As a matter of fact, I prefer that when the damper is in the ultimate closed position permitted by the adjustment of plates, 13 and 26, it is not seated definitely so as to prevent the passage of air around it, and to this end the damper stop lug, 10, is preferably provided with the projection, $10^b$, previously referred to, which will engage the stop lug, 15, on the plate 13, before the damper reaches the completely closed position, and thus permit the passage of a certain amount of air around the edges of the damper. This permits me to make the central aperture, $5^a$, smaller than would otherwise be necessary, and adds strength to the damper itself.

As the products of combustion passing through the stack may at times exceed the temperature at which the damper is arrested in its closed position, the increased heat imparted to the thermostatic element after the arresting of the damper would have a tendency to distort the thermostatic member and bend it out of normal condition and adjustment so as to interfere with its accurate operation thereafter. In order to overcome this difficulty the relief spring, 41, is provided and is coiled in such a direction that after the thermostatic member, 43, has moved the damper to its closed position, the increase in temperature of the products of combustion passing through the damper casing will cause the thermostatic element to react upon the shaft, 4, and rotate it in a direction to increase the torsion of the relief spring, 41, the rotation of the shaft acting to wind up more tightly the relief spring. The relief spring also acts to prevent injury to the thermostatic member in case the heating plant should stand idle and be exposed to extremes of low temperature below that which would cause the thermostatic member to move the damper to the full open position, in which case after the movement of the damper is stopped, the further action of the thermostatic member would react upon the shaft and tend to rotate it in a direction to unwind the relief spring. The relief spring, therefore, compensates for the increased movement of the thermostatic member, 43, beyond that permitted by the controlling stop mechanism for the damper, and preserves the thermostatic member from injury.

Figure 3:
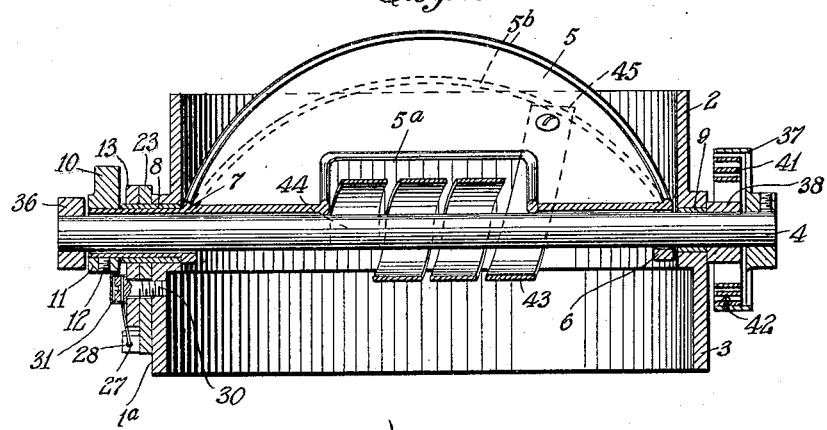
Fig. 3 represents a horizontal sectional view of the device.

The relief spring also serves another important purpose in delaying the closing of the damper when the fire is first lighted, until the stack has attained a sufficiently high temperature to insure and maintain a desired amount of draft. It is to be noted that the thermostatic element is interposed between the relief spring and the damper and acts in one direction on the damper and in the opposite direction on the relief spring. It will also be obvious that when the fire is started the thermostatic element will heat up more rapidly than the stack. In my construction as the thermostatic element begins to heat up it reacts on the relief spring until the latter attains a resistance equal to turning resistance of the damper, after which the movement of the relief spring stops and the damper begins to move toward the closed position. This retards the closing of the damper and permits the stack to heat up to a point where a sufficient draft is insured and maintained before the damper is closed. As shown in Fig. 3, the housing, 37, carrying one end of the relief spring is secured to the shaft, 4, by a set screw, $37^a$, and this initial tension of the relief spring may be adjusted by rotating the housing with respect to the shaft and securing it in adjusted position by the set screw, $37^a$, thus adjusting the relief spring to secure the desired retardation of the closing movement of the damper.

It will be seen that the automatic damper unit will hold the damper in the proper open position for starting the heating apparatus with which it is used, and may be set for any desired maximum opening in the cold position, and for any maximum closed position in the hot position, so that the desired amount of draft may be had at the time of starting the plant and will be automatically reduced as low as desired when the heating plant is in full operation, the thermostatic member being protected against injurious distortion from high temperature when the damper is in the closed position and the adjusting devices for the damper being sealed against injudicious manipulation by unskilled persons.

I conveniently provide the casing, 1, with attaching means such as the screw eyes, indicated at 50, disposed at opposite points 90° remote from the axis of the damper shaft, 4, which may be employed to support the damper from a suitable stationary support above the same, when it is used in a horizontal stack or pipe, for the purpose of relieving the stack itself of the weight of the damper casing and attaching parts. When the damper unit is used in a vertical stack, it will naturally be supported from the pipe section below the damper unit, but even in such position the eyes, 50, may be connected with supporting means connected to a stationary part, in order to relieve the pipe section from an undue amount of the weight of the unit, if desired. It will be noted that the temperature adjusting stop mechanism is located exterior to the casing, where it can be readily adjusted while the heating plant is in operation, to secure the desired operation of the damper and the correct range of movement which is to be permitted to the damper in order to secure the most efficient and safe operation of the plant. It will also be noted that the relief spring is likewise located outside of the damper casing where it is protected from the high temperature of the products of combustion and the heat transmitted to it through the shaft and casing may be readily radiated to the atmosphere, thus preventing it from becoming overheated to a degree which might affect its temper.

What I claim and desire to secure by Letters Patent is:—

1. The combination with a damper casing, of a shaft rotatably mounted therein, a damper pivotally mounted on said shaft, a helical thermostatic member having one end connected with the shaft and the other end connected with the damper, a relief spring casing secured to said shaft and located outside of said damper casing, a relief spring in said casing, having one end secured thereto and the other end secured to the damper casing, and means for arresting the movement of the damper under the action of said thermostatic member, said relief spring being constructed to normally hold the shaft in a predetermined position, but permitting the shaft to rotate under the action of the thermostatic member, after the movement of the damper is arrested, to prevent injury to the thermostatic member.

2. The combination with a casing, of a damper rotatably mounted therein, and means for imparting rotary movement to said damper in opposite directions, a pair of superimposed plates, adjustable with respect to each other and to the casing, a stop on one of said plates for limiting the movement of the damper in one direction, a stop on the other plate for limiting the movement of the damper in the opposite direction, a stop secured to the damper and movable between said plate stops, and means for securing said plates in their adjusted positions.

3. The combination with a casing, of a damper rotatably mounted therein, and means for imparting rotary movement to said damper in opposite directions, a damper stop located outside of said casing and secured to said damper, a pair of superimposed plates, movable with respect to each other and with respect to the casing coaxially with the damper and located on the outside of said casing, one of said plates being provided with a stop to engage the damper stop to limit the closing movement of the damper, and the other of said plates being provided with a stop to engage the damper stop to limit the opening movement of the damper, and means for securing said plates in their adjusted positions.

4. The combination with a casing, of a damper rotatably mounted therein, and means for imparting rotary movement to said damper in opposite directions, a damper stop located outside of said casing and secured to said damper, a pair of superimposed plates, movable with respect to each other and with respect to the casing coaxially with the damper and located on the outside of said casing, one of said plates being provided with a stop to engage the damper stop to limit the closing movement of the damper, and the other of said plates being provided with a stop to engage the damper or stop to limit the opening movement of the damper, and each of said plates being provided with a slot curved coaxially with the axis of the damper, and securing means extending through said slot and engaging the casing for holding said plates in their adjusted position.

5. The combination with a casing, of a damper rotatably mounted therein, and means for imparting rotary movement to said damper in opposite directions, a damper stop located outside of said casing and secured to said damper, a pair of superimposed plates, movable with respect to each other and with respect to the casing coaxially with the damper and located on the outside of said casing, one of said plates being provided with a stop to engage the damper stop to limit the closing movement of the damper, and the other of said plates being provided with a stop to engage the damper stop to limit the opening movement of the damper, said plates being provided with segmental slots having their edges coaxial with the axis of the damper, and at the same distance therefrom and a set screw extending through the said slots of both plates for securing said plates in adjusted position.

6. The combination with a casing, of a damper rotatably mounted therein, and means for imparting rotary movement to said damper in opposite directions, a damper stop located outside of said casing and secured to said damper, a pair of superimposed plates, movable with respect to each other and with respect to the casing coaxially with the damper and located on the outside of said casing, one of said plates being provided with a stop to engage the damper stop to limit the closing movement of the damper, and the other of said plates being provided with a stop to engage the damper stop to limit the opening movement of the damper, means for securing said plates in adjusted positions, and sealing means for preventing the readjustment of said plates, and the stops carried thereby.

7. The combination with a casing, of a damper rotatably mounted therein, and means for imparting rotary movement to said damper in opposite directions, a damper stop located outside of said casing and secured to said damper, a pair of superimposed plates, movable with respect to each other and with respect to the casing coaxially with the damper and located on the outside of said casing, one of said plates being provided with a stop to engage the damper stop to limit the closing movement of the damper, and the other of said plates being provided with a stop to engage the damper stop to limit the opening movement of the damper, said plates being provided with segmental slots having their edges coaxial with the axis of the damper, and at the same distance therefrom, a set screw extending through the slots of both plates for securing them in adjusted position, and sealing means including a cap for enclosing the head of said screw, said head and cap having registering apertures, a sealing wire, and a seal for connecting the end portions of said wire.

8. The combination with a damper casing, provided with opposite bearing apertures, of a shaft extending through said apertures, a damper pivotally mounted on said shaft and provided with a sleeve extending through one of said apertures, a damper stop carried by said sleeve, a pair of superimposed stop plates coaxial with the said shaft located on the exterior of the casing, and each provided with a stop to engage said damper stop, said plates being adjustable to limit the range of movement of the damper, and being provided with curved slots coaxial with the shaft and adapted to overlap, a set screw engaging the slots of both plates and secured to the casing to lock the plates in adjusted position, a thermostatic member having one end connected to said shaft, and the other connected to the damper, and a relief spring operatively connected with said shaft for holding it normally in a predetermined position but permitting rotation of the shaft under the action of the thermostatic member to prevent injury thereto.

9. The combination with a damper casing, provided with opposite bearing apertures, of a shaft extending through said apertures, a damper pivotally mounted on said shaft and provided with a sleeve extending through one of said apertures, a damper stop carried by said sleeve, a pair of superimposed stop plates coaxial with the said shaft located on the exterior of the casing, and each provided with a stop to engage said damper stop, said plates being adjustable to limit the range of movement of the damper, and being provided with curved slots coaxial with the shaft and adapted to overlap, a set screw engaging the slots of both plates and secured to the casing to lock the plates in adjusted position, a thermostatic member having one end connected to said shaft, and the other connected to the damper, a relief spring casing secured to the shaft outside of said casing, and a relief spring in said casing having one end connected with the spring casing and the other end connected with the damper casing.

10. The combination with a casing, and a damper movably supported therein, of a thermostatic element operatively connected at one end to the damper and at the other end to the casing, and a resilient relief device interposed between one end of the thermostatic element and the part operatively connected with said end, and capable of yielding under the reaction of the thermostatic element until said relief device attains a resistance equal to the turning resistance of the damper.

11. The combination with a casing, and a damper pivotally supported therein, of a thermostatic element located within the casing and having one end operatively connected with the damper, a resilient relief device located outside of said casing and operatively connected with the other end of said thermostatic element, and with a stationary part of the casing, and capable of yielding under the reaction of the thermostatic element until it attains a resistance equal to the turning resistance of the damper, and means for limiting the movement of the damper with respect to the casing.

12. The combination with a cylindrical casing, for the passage of heated products of combustion therethrough, a revoluble shaft extending through said casing, a damper rotatably mounted with respect to said shaft, a coil thermostatic element comprising united strips of metals having different co-efficients of expansion, one end of said element being connected to the damper and the other end to said shaft, a coiled relief spring located outside of said casing, and having one end connected with said shaft and the other end connected with a fixed part of the casing, said relief spring being capable of yielding under the reaction of the thermostatic element until it attains a resistance equal to the turning resistance of the damper, and stops for limiting the movement of the damper.

13. The combination with a casing, and a damper pivotally supported therein, of a thermostatic element located within the casing and having one end operatively connected with the damper, a resilient relief device located outside of said casing and operatively connected with the other end of said thermostatic element, and with a stationary part of the casing, and capable of yielding under the reaction of the thermostatic element until it attains a resistance equal to the turning resistance of the damper, means for limiting the movement of the damper with respect to the casing, and means for adjusting the initial resistance of the said resistance device to vary the temperature at which the damper will be moved and the temperature at which it will be arrested.

In testimony whereof I affix my signature.

HARRY E. LAKE.